Figure 1:
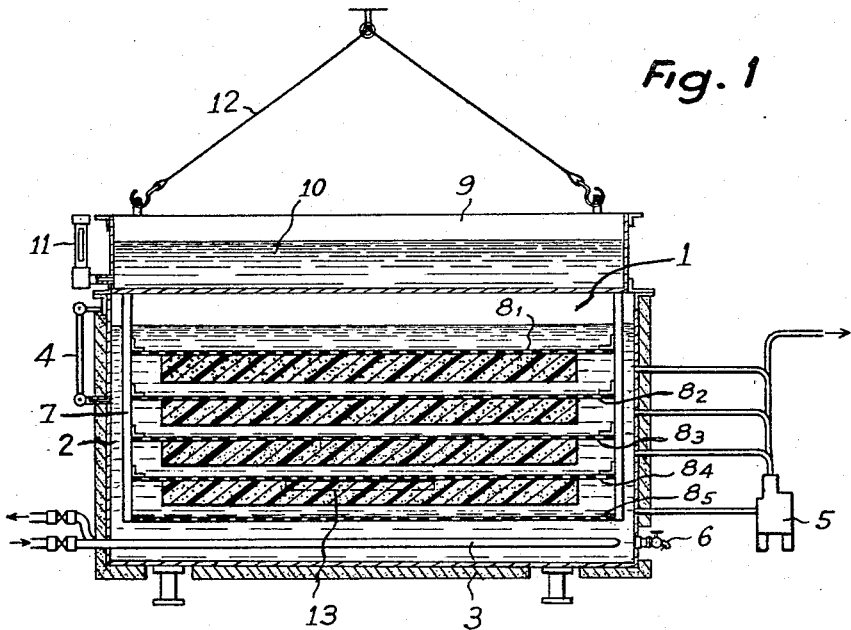

Nov. 1, 1966　　　Y. LANDLER ETAL　　　3,283,043
METHOD AND APPARATUS FOR IMMERSION MOLDING A FOAMABLE
POLYVINYL CHLORIDE AND POLYISOCYANATE PREFORM
Filed Feb. 4, 1963　　　　　　　　　　　　　3 Sheets-Sheet 1

INVENTORS
YVAN LANDLER
JOSEPH REYGROBELLET
MICHEL FERDINAND VERNON
ANDRE LECLERCQ

BY: Paul M. Craig, Jr.
ATTORNEY

INVENTORS
YVAN LANDLER
JOSEPH REYGROBELLET
MICHEL FERDINAND VERNON
ANDRE LECLERCQ

BY: Paul M. Craig, Jr.
ATTORNEY

Nov. 1, 1966 Y. LANDLER ETAL 3,283,043
METHOD AND APPARATUS FOR IMMERSION MOLDING A FOAMABLE
POLYVINYL CHLORIDE AND POLYISOCYANATE PREFORM
Filed Feb. 4, 1963 3 Sheets-Sheet 3

INVENTORS
YVAN LANDLER
JOSEPH REYGROBELLET
MICHEL FERDINAND VERNON
ANDRE LECLERCQ

BY: Paul M. Craig, Jr.
ATTORNEY

United States Patent Office 3,283,043
Patented Nov. 1, 1966

3,283,043
METHOD AND APPARATUS FOR IMMERSION MOLDING A FOAMABLE POLYVINYL CHLORIDE AND POLYISOCYANATE PREFORM
Yvan Landler, Sceaux, Joseph Reygrobellet, Meaux, and Michel Ferdinand Vernon and Andre Leclercq, Trilport, France, assignors to Société anonyme dite: Pneumatiques, Caoutchouc Manufacture et Plastiques Kleber Colombes, Colombes, France
Filed Feb. 4, 1963, Ser. No. 255,876
Claims priority, application France, Feb. 5, 1962, 887,184
13 Claims. (Cl. 264—54)

The present invention relates to an improvement in the manufacture of cellular objects of plastic materials, particularly those made of plastics having a polyvinyl chloride base.

The present invention has particular application to the technique, known per se, by means of which cellular plastic material is obtained in two stages:

(1) Molding under pressure a mixture having a polyvinyl chloride base containing an isocyanate or a polyisocyanate and also a blowing or swelling agent, which decomposes during the molding operation under the effect of the heat, thereby forming an embryonic cellular object, and (2) Heating of this object in an atmosphere rich in steam or water vapor, which increases the size of the object, and brings about hardening of the material to a desired degree.

This technique has been widely exploited in recent years; rigid cellular objects having a polyvinyl chloride base have been put to very varied uses, such as sonic and thermal insulation, buoyancy devices, etc.

In the industrial exploitation of this process, the second phase corresponding to the expansion and hardening of the material normally lasts for 5 to 6 hours and may sometimes extend to 15 to 20 hours.

The slowness of this operation is the principal obstacle in practice to the satisfactory development of these manufacturing techniques, as it involves a multiplication of the vapor bath for the treatment of the manufactured product.

One of the objects of the present invention is to remedy this disadvantage. To this end, the present invention provides apparatus for the manufacture of expanded cellular material, comprising a vessel containing an expansion bath, means for heating the bath and means for keeping the cellular material immersed in the bath during the expansion phase.

Several embodiments of the apparatus defined above will be described hereinafter. In one of these embodiments, the means of keeping the material immersed in the expansion bath consist of a system of grids supporting the material to be expanded and holding it in place in the immersed position during the expansion treatment.

In another embodiment of this apparatus, the expansion vessel is divided up into a plurality of compartments by vertical partitions keeping the cellular plates to be expanded substantially in the vertical position thereof during their expansion. This vertical arrangement of the plates facilitates their extraction after expansion.

The present invention relates not only to apparatus of the type defined above, but also to a manufacturing process for cellular objects in which the object undergoes an expansion treatment by being immersed in a bath, this process being characterized by the use of the hydrostatic thrust to which the object is subjected in the expansion bath to make this object take its shape against an appropriate molding surface opposite the said thrust, which makes it possible to dispense with later shaping operations.

The invention also relates to apparatus specially designed for the execution of this process or of a similar process in which the means of keeping the cellular objects immersed during the expansion phase consist of shelves arranged one above the other, whose lower surface have an appropriate planar or non-planar configuration, thereby making it possible to shape the cellular object during the expansion phase.

Accordingly, it is an object of the present invention to provide a method for manufacturing cellular objects and an apparatus for carrying out such method which effectively eliminates, by simple means, the shortcomings and disadvantages of the prior art.

It is another object of the present invention to provide a method for manufacturing cellular objects and apparatus for carrying out such method which lends itself readily to economic production techniques, eliminates unacceptably lengthy operations, and permits the elimination of subsequent shaping operations.

Still another object of the present invention resides in the provision of a method for expanding embryonic cellular objects in an atmosphere rich in steam or water vapor as well as of an apparatus capable of realizing such method which reduces the time involved in the expanding operation, enables the cellular object to be shaped directly during the expansion phase at least at some of the surfaces thereof so as to dispense with subsequent shaping operations, and permits a simple control of the density of the cellular objects.

A further object of the present invention resides in the provision of a method and apparatus for making cellular objects made of plastics having a polyvinyl chloride base, which admits of improved quality control and greater uniformity in the finished product than has been realizable heretofore.

Figure 2:
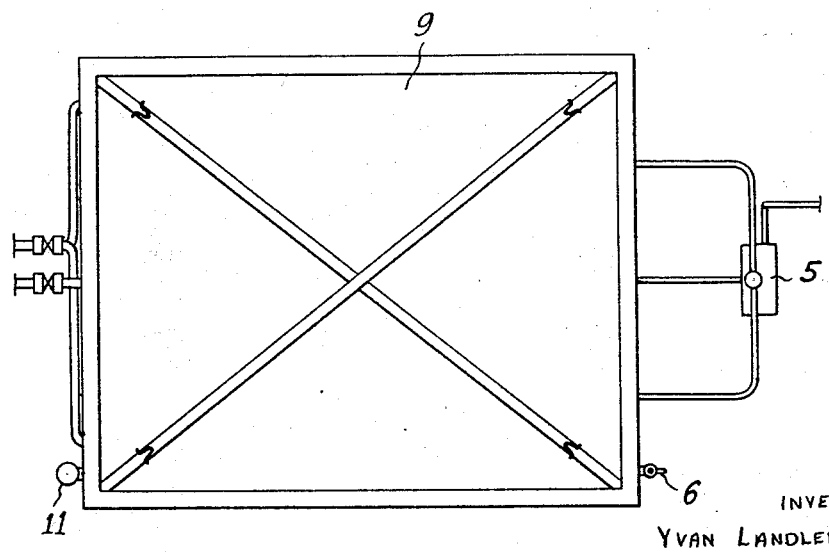
Figure 3:
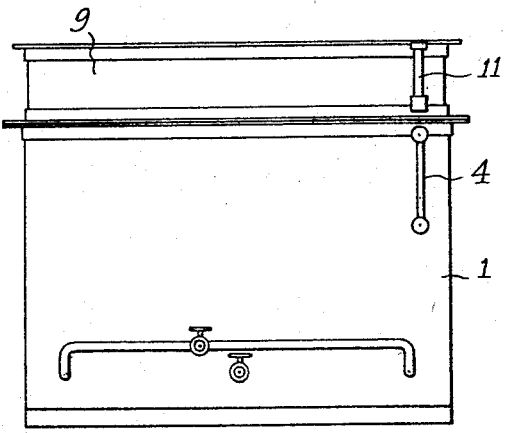
Figure 4:
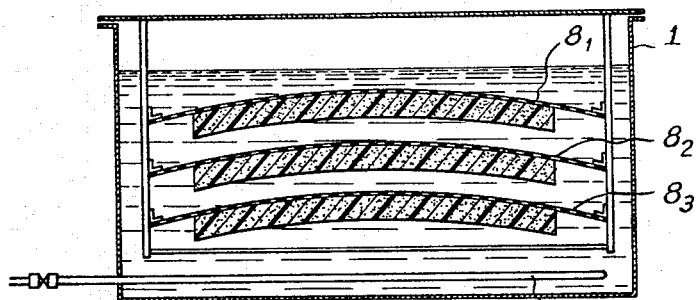
Figure 5:
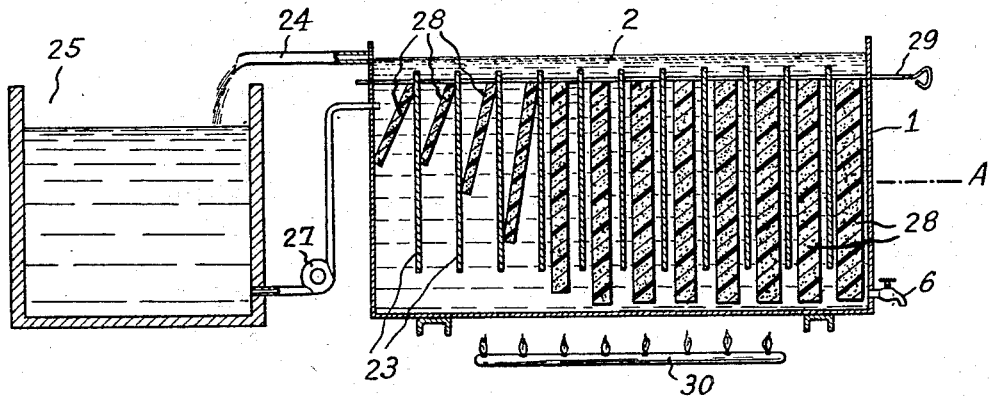

These and other objects, features and advantages of the present invention will become more apparent from the following description when taken in connection with the accompanying drawings which illustrate, as non-limiting examples, some embodiments of the apparatus in accordance with the present invention and wherein:

FIGURE 1 is a vertical section through an assembly which represents an apparatus in accordance with the present invention for the expansion of cellular objects in the form of plates, FIGURE 2 is a plan view of the apparatus shown in FIGURE 1, FIGURE 3 is a view from the left of the apparatus shown in FIGURE 1, FIGURE 4 is a more schematic cut-away view showing a practical modified embodiment of an apparatus in accordance with the present invention derived from FIGURE 1 and, FIGURE 5 is also a schematical view of still another modified embodiment of an apparatus in accordance with the present invention.

Referring now to the drawings wherein like reference numerals are used throughout the various views to designate like parts, the apparatus shown in FIGURES 1, 2 and 3 comprises a vessel 1 whose general shape is rectangular, with heat-insulated walls, designed to contain an expansion bath 2, consisting broadly of water heated by a serpentine element 3 extending horizontally at the bottom of the vessel 1 and having super-heated steam running through its pipes. The level of the bath 2 is made visible by a gauge glass 4, while a pump 5 ensures either the stirring of the bath by causing it to recirculate, or its partial or total emptying into a recuperation vessel (not shown). A tap 6 is provided to empty the vessel 1.

Inside the vessel 1 descends a system of grids made up of vertical stays 7 supporting several horizontal sheets $8_1$, $8_2$, $8_3$, $8_4$, $8_5$ of perforated cloth, with a gap therebetween which is determined as a function of the dimensions of the cellular objects to be obtained. The vertical stays 7 of this system of grids are fixed to the lower part of a lid 9 enabling the top opening of the vessel 1 to be more or less hermetically closed. This lid 9 has, in the illustrated example, the shape of a tank which may contain a certain quantity of water 10 whose level is indicated by a gauge glass 11, the said water 10 serving both as ballast for the grid system and as thermal insulation of the vessel 1 by preventing losses of water vapor. Instead of water 10, another product, ballast, or an insulating material, such as sand, for instance, may be used. The assembly of the lid 9 and the grid system is completely movable and may, for example, be maneuvered by means of a pulley and slings 12.

The apparatus described hereinabove is used in the following manner: the vessel 1, from which the lid 9 is removed, is filled with water to a certain level, deep enough to permit the immersion of the cellular material to be expanded, and this water is heated by means of the serpentine element 3. When the expansion bath 2 is ready, the embryonic cellular objects are placed on the shelves $8_2$, $8_3$, $8_4$, $8_5$ of the grid system. In FIGURE 1, the dot and dash line 13 shows the approximate size of an embryonic cellular object leaving the mold after the first stage of the process. The lid 9 and the grid system 7, 8 are then brought along and placed in correct relation to the vessel 1, whereby the grid system is lowered into the expansion bath 2. The action of the water and of the heat on the cellular objects 13 placed on the shelves 8 causes their expansion by the development of microcells. The result is that the density of the objects becomes less than that of water and that the objects are subjected to a vertical hydrostatic thrust growing in intensity which tends to press the objects against the lower surfaces of the shelves $8_1$, $8_2$, $8_3$, $8_4$. These shelves 8 then play the role of a holding element for the cellular plates, keeping them in position and immersed in the bath 2. Further, due to the pressure resulting from the hydrostatic thrust, these shelves serve to shape the cellular plates as they are expanded. In the case of FIGURE 1, as the shelves 8 have plane lower surfaces, they impart to cellular plates also plane surfaces and a stable shape. In this particular case, this process makes it possible to dispense with, or at least, considerably to reduce the use of the flattening presses used formerly to smooth out the cellular plates.

During the expansion the water level in the vessel 1 rises. The pump 5 makes it possible to empty a part of the bath 2 into an auxiliary vessel from which it will be recuperated for the following operation. In any case the said auxiliary vessel may be constituted by the lid 9 itself, and in this case, a hole is provided for the return of the said quantity of water 10 into the vessel 1. Whether or not this particular arrangement is used, the water 10 in the tank-shaped lid 9 makes it possible to ballast the assembly of the grid system to allow it to resist the hydrostatic thrust which develops during the expansion of the cellular plates.

Further, by means of the gauge 4, the expansion of the cellular plates may be controlled so as to obtain plates having the desired density. Actually, the increase in volume of the plates causes the rise of the level of the water in the vessel 1, so that by means of the gauge 4 a correlation may easily be made between the density of the plate and the height of the water level. Once the level corresponding to a certain density of the cellular product is known, it remains only to extract the plates from the vessel once the predetermined level has been reached. Thus the density may easily be controlled during the expansion phase, which is practically impossible when the operation is carried out in an oven. Hence this method makes it possible to manufacture cellular products of constant quality by making a great reduction in the proportion of the products which fall outside the required limits.

As has been shown above, the shelves holding the cellular plates during the expansion operation also serve to shape the cellular material during its treatment. Thus, non-planar shapes may be given to these shelves so as to form the cellular plates correspondingly. FIGURE 4 is a schematic view of an expansion vessel 1 in which the grid system has shelves $8_1$, $8_2$, $8_3$ curving upwards which makes it possible to obtain directly curved cellular plates of the desired shape.

The radius of curvature and even the form of shelves 8 may vary to large extents.

According to a modified embodiment of the shaping process of the plates, which was just described, the spacing of shelves $8_1$, $8_2$, $8_3$, $8_4$, $8_5$ is chosen in such a way that, without fail, by the end of the expansion, the cellular plates abut, not only against the inferior faces but as well against the superior faces of the adjoining shelves, each cellular plate being thus pressed between two successive shelves. This process offers several advantages, i.e.: it permits shaping the two principal faces of cellular plates, giveing them plane or non-plane shapes, for example, curved shapes, such faces not being necessarily parallel. Such process allows also an increase in the abutment pressure of the plates against the shelves, such pressure getting stronger than the sole pressure due to the water pressure; it further permits to limit the expansion of cellular plates in the sense of the thickness thereof and so, to get more regular thicknesses from one plate to the next.

In all the embodiments described hereinabove, the shelves 8 may be realized in "caillebotis," that is, grate-like shelves constituted by metallic lamellae set on edges instead of being made of perforated plates, for the purpose of reinforcing the resistance of such shelves to flexion.

In such an apparatus, the supporting shelves for the cellular plates may be fixed, or they may also be movable, to allow the adjustment of their spacing before the expansion takes place, or to follow, to a certain extent, the expansion of the plates during the course of expansion; the shelves being, for instance, subject to the action of springs, which permits their being pushed back, in a spring-like manner or to the action of positive driving screws, with a view toward facilitating the removal of the expansion plates, which are pressed between the faces of the supporting shelves.

FIGURE 5 shows another embodiment of an apparatus according to the present invention. In this figure of the drawing, reference numeral 1 designates the vessel for the expansion bath 2. The rectangular shaped vat 1 is divided into compartments by vertical transverse partitions 23 which terminate a certain distance above the floor of the vessel, to allow free communication between the various compartments. These partitions 23 may be perforated so as to facilitate the circulation of convection currents when the bath is heated. At the upper end of the vessel 2, an overflow conduit 24 is provided which terminates above a recuperation vessel 25. At the lower end of the vessel 1, an emptying tap 6 is provided above another recuperation tank which is not shown in the drawing. Means such as the pump 27 make it possible to return the liquid collected in the recuperation vessels into the treating vessel 1.

The apparatus described above is used in the following manner: to begin with, the vessel 1 is empty or at least has water no deeper than line A. Embryonic cellular plates 28 are inserted into each compartment of the vat, these plates having been obtained beforehand by molding under pressure a mixture having a polyvinyl chloride base and also containing an isocyanate or a polyisocyanate, and a swelling agent, which, during the molding, is decomposed by heat to form an embryonic cellular structure.

After placing small-sized plates 28 into each of the compartments of the vessel 1, a locking rod or several locking rods 29 are engaged in the walls of the vessel. This rod or rods 29 preferably pass through the partitions 23 so as to rest thereon. The points at which the walls of the vessel 1 are passed through by the rod or rods 29 are provided with suitable conventional hermetic seals.

The vessel is then filled with water up to the overflow level 24, and then this water is heated by any means, e.g., by burners 30. The result of this heating is the expansion of the embryonic plates 28. These plates 28, as they consist of closed cells, obviously have a tendency to rise, but they are kept in their respective compartments by means of rods 29. FIGURE 5 shows the successive shapes taken up by the plates 28 during their expansion. It is evident that in practice all the plates 28 increase in volume substantially in unison.

As the expansion progresses, the water of the treating bath 2 is expelled from the vessel 1 and flows off via the overflow 24 into the recuperation vessel 25.

At the end of the treatment, fully expanded cellular plates are extracted from the vessel 1.

This may be done in two ways:

(a) By withdrawing the rods 29 so as to progressively free the compartments of the vessel 1. In this case, the expanded plates rise automatically from the vessel as a result of their buoyancy and it remains only to take them out. If several rods 29 are arranged parallel to one another, only those rods at one side of the vessel may be withdrawn so as to make the plates tilt in order that they surface at one of their upper corners, or (b) By partially or completely emptying the vessel 1 beforehand by means of the tap 6, so that the expanded plates remain in their respective compartments.

After inserting a new set of embryonic cellular plates into the vat 1 ready for another operation, the water expelled during the expansion into the vessel 25, and, where necessary, the water emptied after the treatment, is returned into the vessel 1. These recuperation vessels may be heat-insulated so as to reduce heat losses.

Also according to the present invention use is made of the flow of excess liquid from vat 1 to control the end of the expansion phase and to warn the operator by an appropriate indicator device. For example, a small turbine meter to measure the volume of the flow of liquid may be placed in the overflow conduit 24, whereby the stoppage of the said meter when the expansion of the plates and, as a result thereof, the flow ceases, sets off a visual or sonic warning device.

Further, as has been shown above, the level in the recuperation tank 25 may be observed, for example, by means of an observation slit or a gauge tube, or, again, by means of a float device setting off a warning system.

While we have shown and described several embodiments in accordance with the present invention, it is understood that the same is not limited thereto but is susceptible of numerous changes and modifications within the spirit and scope thereof as known to a person skilled in the art, and we therefore do not wish to be limited to the details shown and described herein but intend to cover all such changes and modifications as are encompassed by the scope of the appended claims.

We claim:

1. A method for the manufacture of a polyvinyl chloride cellular object which comprises immersing a preformed cellular object comprising polyvinyl chloride and an isocyanate or polyisocyanate in an aqueous bath and maintaining the upper surface of said immersed object in contact with at least approximately horizontal shelf means and opposing the hydrostatic thrust directed from the bottom of the bath in the upward direction to which said object is subjected, whereby said object is expanded and shaped to a desired dimension.

2. The method of claim 1, wherein the spacing of the opposite faces of adjacent shelf means in the vertical dimension is at least slightly smaller than the thickness that the cellular objects would assume toward the end of the expansion phase if the objects were applied only against the lower surface of a corresponding shelf means holding the same immersed in said bath, whereby said objects are shaped both from above and from below.

3. The method of claim 1, wherein said preformed cellular object additionally comprises a decomposable blowing agent.

4. The method of claim 1, wherein said shelf means is non-planar, whereby said cellular object assumes a corresponding non-planar shape.

5. The method of claim 1, wherein said aqueous bath is heated.

6. An apparatus for the manufacture of a cellular object in which the object is made to undergo an expansion treatment by immersion comprising:
   immersion bath means,
   and at least approximately horizontal shelf means of which the lower surfaces of each shelf means constituting molding surfaces holds at least one object in the immersion bath means,
   said shelf means having a non-planar shape at least at the lower surfaces thereof to directly impart a corresponding shape to the cellular object during the expansion phase.

7. Apparatus according to claim 6, further comprising heating means for said bath.

8. Apparatus according to claim 6, wherein said shelf means is constituted by perforated plates.

9. Apparatus according to claim 6, further comprising removable cover means for said bath means, said shelf means being secured to said cover means.

10. Apparatus according to claim 9, wherein said cover means is in the form of a tank containing water or sand to weight down said cover means.

11. Apparatus according to claim 6, further comprising gauge means to indicate the height of the liquid in said bath during the expansion phase, whereby the density of the cellular product being manufactured is indirectly measured.

12. An apparatus for the manufacture of a cellular object in which the object is made to undergo an expansion treatment by immersion comprising:
   immersion bath means,
   and at least approximately horizontal shelf means of which the lower surfaces of each shelf means constituting molding surfaces holds at least one object in the immersion bath means,
   the spacing of the opposite faces of adjacent shelf means in the vertical dimension being at least slightly smaller than the thickness that the cellular objects would assume toward the end of the expansion phase if the objects were applied only against the lower surface of a corresponding shelf means holding the same immersed in said bath.

13. Apparatus according to claim 12, wherein said shelf means presents a curved lower surface.

References Cited by the Examiner

UNITED STATES PATENTS

| | | | |
|---|---|---|---|
| 543,327 | 7/1895 | Bertels. | |
| 1,269,229 | 6/1918 | Smith | 264—88 XR |
| 1,377,517 | 5/1921 | Novotny. | |
| 1,429,507 | 9/1922 | Jones | 220—23 |
| 1,656,874 | 1/1928 | Snyder. | |
| 1,698,846 | 1/1929 | Hutchens. | |
| 2,145,731 | 1/1939 | Minor | 264—50 |

(Other references on following page)